United States Patent
Barth

(10) Patent No.: US 12,363,231 B2
(45) Date of Patent: Jul. 15, 2025

(54) SYSTEM AND METHOD FOR VOICE CALL CONNECTION FROM AN OTT NETWORK

(71) Applicant: VIBER MEDIA S.A.R.L., Luxembourg (LU)

(72) Inventor: Matan Barth, Luxembourg (LU)

(73) Assignee: VIBER MEDIA S.A.R.L., Luxembourg (LU)

( * ) Notice: Subject to any disclaimer, the term of this patent is extended or adjusted under 35 U.S.C. 154(b) by 292 days.

(21) Appl. No.: 17/796,082

(22) PCT Filed: Feb. 3, 2021

(86) PCT No.: PCT/IB2021/050864
§ 371 (c)(1),
(2) Date: Jul. 28, 2022

(87) PCT Pub. No.: WO2021/156758
PCT Pub. Date: Aug. 12, 2021

(65) Prior Publication Data
US 2023/0071546 A1 Mar. 9, 2023

Related U.S. Application Data

(60) Provisional application No. 62/969,241, filed on Feb. 3, 2020.

(51) Int. Cl.
*H04M 3/00* (2024.01)
*H04L 12/66* (2006.01)
(Continued)

(52) U.S. Cl.
CPC .......... *H04M 7/1285* (2013.01); *H04L 45/64* (2013.01); *H04L 67/141* (2013.01)

(58) Field of Classification Search
CPC ..... H04L 67/12; H04L 65/1069; H04L 43/16; H04L 41/5019; H04L 45/745;
(Continued)

(56) References Cited

U.S. PATENT DOCUMENTS

| | | |
|---|---|---|
| 5,936,940 A | 8/1999 | Marin et al. |
| 6,865,266 B1 | 3/2005 | Pershan |

(Continued)

FOREIGN PATENT DOCUMENTS

| | | |
|---|---|---|
| EP | 2929658 B1 | 3/2019 |
| WO | 2006129296 A1 | 12/2006 |

(Continued)

OTHER PUBLICATIONS

M. Chen, X. Fan, M. N. Murthi, T. D. Wickramarathna and K. Premaratne, "Normalized Queueing Delay: Congestion Control Jointly Utilizing Delay and Marking," in IEEE/ACM Transactions on Networking, vol. 17, No. 2, pp. 618-631, Apr. 2009, doi: 10.1109/TNET.2008.926508.

(Continued)

*Primary Examiner* — Kharye Pope
(74) *Attorney, Agent, or Firm* — The Roy Gross Law Firm, LLC; Roy D. Gross

(57) ABSTRACT

A system comprising: at least one hardware processor; and a non-transitory computer-readable storage medium having stored thereon program code, the program code executable by the at least one hardware processor to: receive, by an over-the-top (OTT) network server, from an OTT terminal application (OTA), a request to establish voice communication with a known external service; access, by said OTT network server, a database which comprises at least one routing option associated with said known external service; select, by said OTT network server, one of said routing options for establishing said voice communication; and establish said voice communication with said known external service using said selected routing option.

15 Claims, 7 Drawing Sheets

(51) Int. Cl.
*H04L 45/64* (2022.01)
*H04L 67/141* (2022.01)
*H04M 5/00* (2006.01)
*H04M 7/12* (2006.01)

(58) Field of Classification Search
CPC ..... H04L 67/10; H04L 41/5051; H04L 45/74; H04L 63/102; H04L 65/102; H04L 47/2408; H04L 65/1104; H04L 45/306; H04L 12/2898; H04L 12/289; H04W 88/06; H04W 8/26; H04W 40/02; H04W 60/00; H04W 60/005; H04W 48/18; H04W 28/0268; H04W 12/03; H04W 72/569; H04W 4/60; H04W 84/12; H04W 84/042; H04W 12/69; H04W 12/72; H04W 4/00
See application file for complete search history.

(56) References Cited

U.S. PATENT DOCUMENTS

| | | | |
|---|---|---|---|
| 7,460,480 B2 | 12/2008 | Awais | |
| 7,668,968 B1 | 2/2010 | Smith | |
| 8,180,045 B2 | 5/2012 | Coppage | |
| 9,025,755 B1* | 5/2015 | Jayapalan | H04L 65/1104 379/221.01 |
| 2003/0002485 A1 | 1/2003 | Emerson, III | |
| 2003/0091029 A1 | 5/2003 | Jo et al. | |
| 2003/0131132 A1* | 7/2003 | Cheng | H04M 15/55 709/239 |
| 2005/0232227 A1 | 10/2005 | Jorgenson et al. | |
| 2006/0072726 A1 | 4/2006 | Klein et al. | |
| 2007/0002830 A1 | 1/2007 | Beckemeyer | |
| 2008/0267384 A1 | 10/2008 | George | |
| 2009/0022149 A1 | 1/2009 | Rosenberg et al. | |
| 2009/0168757 A1 | 7/2009 | Bush | |
| 2010/0098057 A1 | 4/2010 | Stewart | |
| 2011/0205889 A1 | 8/2011 | Chen et al. | |
| 2011/0216648 A1 | 9/2011 | Mehrotra et al. | |
| 2014/0043994 A1 | 2/2014 | Bansal et al. | |
| 2014/0313902 A1* | 10/2014 | Bruner | H04L 65/1069 370/235 |
| 2015/0304934 A1* | 10/2015 | Malatack | H04L 41/5051 455/552.1 |
| 2017/0041213 A1* | 2/2017 | Nadalin | H04L 45/24 |
| 2019/0045063 A1* | 2/2019 | Lyman | H04L 65/1069 |
| 2019/0319858 A1* | 10/2019 | Das | H04W 56/001 |
| 2020/0092275 A1* | 3/2020 | Seed | H04L 67/142 |

FOREIGN PATENT DOCUMENTS

| | | |
|---|---|---|
| WO | 2007025311 A2 | 3/2007 |
| WO | 2009008829 A1 | 1/2009 |
| WO | 2011022104 A1 | 2/2011 |
| WO | 2011041519 A2 | 4/2011 |

OTHER PUBLICATIONS

K. Kotla and A. L. N. Reddy, "Making a Delay-Based Protocol Adaptive to Heterogeneous Environments," 2008 16th Interntional Workshop on Quality of Service, Enschede, Netherlands, 2008, pp. 100-109, doi: 10.1109/IWQOS.2008.18.
PCT International Search Report for International Application No. PCT/IB2021/050864, mailed May 18, 2021, 3pp.
PCT Written Opinion for International Application No. PCT/IB2021/050864, mailed May 18, 2021, 7pp.
PCT International Preliminary Report on Patentability for International Application No. PCT/IB2021/050864, issued Jul. 28, 2022, 8pp.

* cited by examiner

SYSTEM AND METHOD FOR VOICE CALL CONNECTION FROM AN OTT NETWORK

CROSS REFERENCE TO RELATED APPLICATIONS

This application is a National Phase of PCT Patent Application No. PCT/IB2021/050864 having International filing date of Feb. 3, 2021, entitled "SYSTEM AND METHOD FOR VOICE CALL CONNECTION FROM AN OTT NETWORK", which claims the benefit of priority under 35 U.S.C. § 119 (e) of U.S. Provisional Patent Application No. 62/969,241, filed on Feb. 3, 2020, entitled "VOICE CALL CONNECTION FROM AN OTT NETWORK". The contents of the above applications are all incorporated by reference as if fully set forth herein in their entirety.

FIELD OF THE INVENTION

The present invention relates generally to the field of telecommunications. More specifically, embodiments of the present invention relate to voice call connection from and to an Over The Top (OTT) network.

BACKGROUND

Over-the-top (OTT) communication services provide a wide range of content delivered through applications and third-party services which are independent of the underlying communication infrastructure technology. OTT services may include messaging and voice calling, which use open internet communication protocols to replace existing operator controlled services. Some examples of OTT messaging and/or voice calling service providers include Viber, WhatsApp, WeChat, and Skype. OTT services are typically accessed via websites on personal computers, as well as via applications on mobile devices (such as smartphones and tablets), digital media players (including video game consoles), or televisions with integrated Smart TV platforms.

The foregoing examples of the related art and limitations related therewith are intended to be illustrative and not exclusive. Other limitations of the related art will become apparent to those of skill in the art upon a reading of the specification and a study of the figures.

BRIEF SUMMARY OF THE INVENTION

The following embodiments and aspects thereof are described and illustrated in conjunction with systems, tools and methods which are meant to be exemplary and illustrative, not limiting in scope.

There is provided, in an embodiment, a system comprising: at least one hardware processor; and a non-transitory computer-readable storage medium having stored thereon program code, the program code executable by the at least one hardware processor to: receive, by an over-the-top (OTT) network server, from an OTT terminal application (OTA), a request to establish voice communication with a known external service; access, by said OTT network server, a database which comprises at least one routing option associated with said known external service; select, by said OTT network server, one of said routing options for establishing said voice communication; and establish said voice communication with said known external service using said selected routing option.

There is also provided, in an embodiment, a method comprising: receiving, by an over-the-top (OTT) network server, from an OTT terminal application (OTA), a request to establish voice communication with a known external service; accessing, by said OTT network server, a database which comprises at least one routing option associated with said known external service; selecting, by said OTT network server, one of said routing options for establishing said voice communication; and establishing said voice communication with said known external service using said selected routing option.

There is further provided, in an embodiment, a computer program product comprising a non-transitory computer-readable storage medium having program instructions embodied therewith, the program instructions executable by at least one hardware processor to: receive, by an over-the-top (OTT) network server, from an OTT terminal application (OTA), a request to establish voice communication with a known external service; access, by said OTT network server, a database which comprises at least one routing option associated with said known external service; select, by said OTT network server, one of said routing options for establishing said voice communication; and establish said voice communication with said known external service using said selected routing option.

In some embodiments, the database comprises routing options associated with a plurality of known external services.

In some embodiments, at least some of the known external services are business entities.

In some embodiments, the database further comprises, with respect to each of said known external services, information comprising at least one of: a unique identifier of a telephony endpoint, a telephone number, and a short code number.

In some embodiments, the selected routing option comprises at least one leg effected through a telecommunications service provider (TSP).

In some embodiments, the establishing comprises communicating, by said OTT network server, to said TSP, at least some of said information associated with said known external service.

In some embodiments, the selected routing option comprises at least one leg effected through a dedicated communications line between said OTT network server and said known external service.

In some embodiments, each of the routing options is associated with at least one of: a PSTN service, a voice over IP (VoIP) service, a Session Initiation Protocol (SIP) voice service, and an external OTT network.

In some embodiments, the request is initiated by a user of said OTA by one of: (i) dialing a telephone number of said known external service; (ii) dialing a short code number of said known external services; (iii) clicking an icon of said known external service from within a dedicated page of said known external service on said OTA, and (iv) clicking an icon of said known external service from within a chat page of said known external service on said OTA.

In some embodiments, the request is associated with an OTT communication session between a user of said OTA and said known external service, and wherein an identity of said known external service is determined based, at least in part, on said OTT communication session.

In some embodiments, the known external service comprises a communication system comprising a plurality of endpoints, and wherein said request is to establish voice communication with a specific one of said endpoints.

There is further provided, in an embodiment, a system comprising: at least one hardware processor; and a non-transitory computer-readable storage medium having stored thereon program code, the program code executable by the at least one hardware processor to: receive, by an over-the-top (OTT) network server, from a known external service, a request to establish voice communication with an OTT terminal application (OTA), wherein said request comprises a unique identifier of said OTA; check by said OTT service provider whether it can terminate said voice communication with said OTA; and establish, based on the results of said checking, said voice communication with said OTA.

There is further provided, in an embodiment, a method comprising: receiving, by an over-the-top (OTT) network server, from a known external service, a request to establish voice communication with an OTT terminal application (OTA), wherein said request comprises a unique identifier of said OTA; checking by said OTT service provider whether it can terminate said voice communication with said OTA; and establishing, based on the results of said checking, said voice communication with said OTA.

There is further provided, in an embodiment, a computer program product comprising a non-transitory computer-readable storage medium having program instructions embodied therewith, the program instructions executable by at least one hardware processor to: receive, by an over-the-top (OTT) network server, from a known external service, a request to establish voice communication with an OTT terminal application (OTA), wherein said request comprises a unique identifier of said OTA; check by said OTT service provider whether it can terminate said voice communication with said OTA; and establish, based on the results of said checking, said voice communication with said OTA.

In some embodiments, the known external service is a business entity.

In some embodiments, the checking further comprises verifying an authorization of said known external service to establish said voice communication with said OTA.

In some embodiments, the unique identifier is one of a telephone number, and a short code number.

In some embodiments, the request is received through telecommunications service provider (TSP).

In some embodiments, the establishing further comprises communicating, by said OTT network server, to said TSP, said results of said checking.

In some embodiments, the request is associated with an OTT communication session between a user of said OTA and said known external service.

In addition to the exemplary aspects and embodiments described above, further aspects and embodiments will become apparent by reference to the figures and by study of the following detailed description.

BRIEF DESCRIPTION OF THE DRAWINGS

Exemplary embodiments are illustrated in referenced figures. Dimensions of components and features shown in the figures are generally chosen for convenience and clarity of presentation and are not necessarily shown to scale. The figures are listed below.

Figure 1A:
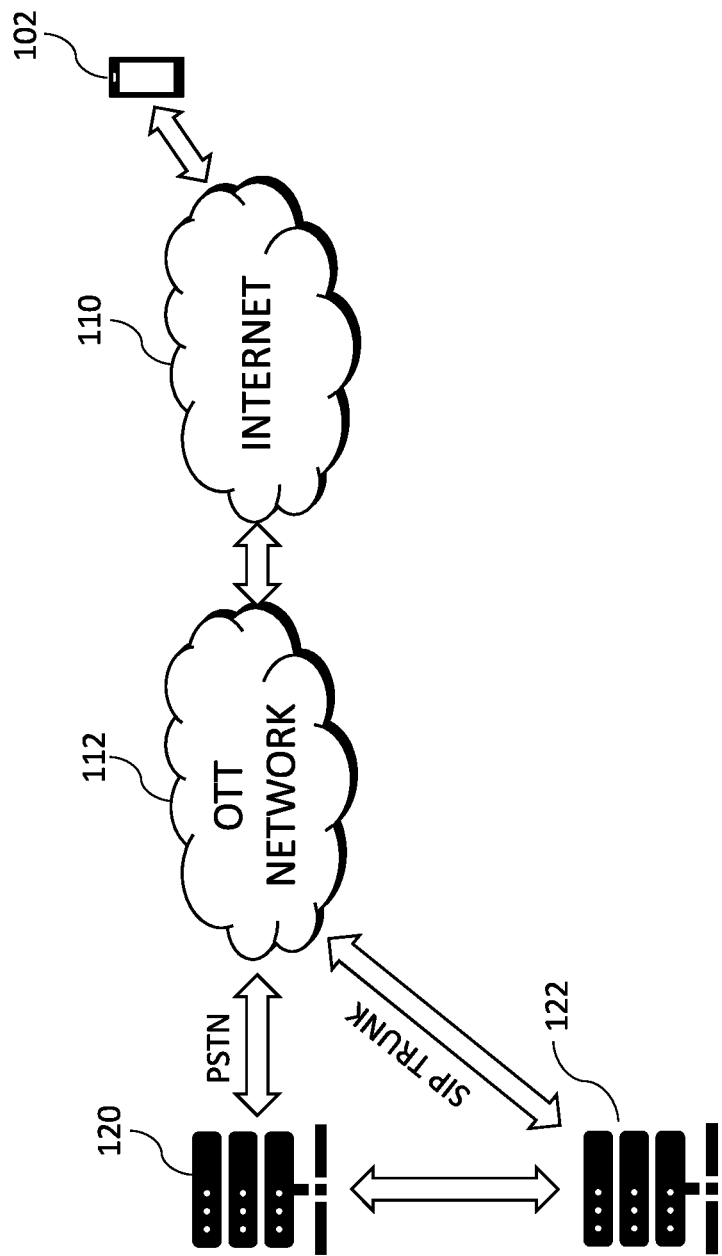
FIG. 1A is a schematic representation of an exemplary seamless OTT-to-traditional telephony destination voice call transition, according to some embodiments of the present disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following description, various aspects of the present invention are described. For purposes of explanation, specific configurations and details are set forth in order to provide a thorough understanding of the present invention. However, it will be also apparent that one skilled in the art that the present invention can be practiced without specific details presented herein. Furthermore, well known features can have been omitted or simplified in order not to obscure the present invention. It should be understood that the phraseology and terminology employed herein is for the purpose of description and should not be regarded as limiting.

Disclosed herein are a system, method, and computer program product which provide for a seamless OTT-to-traditional communication infrastructure voice call transition. In some embodiments, the present disclosure provides for a call originating from an OTT service to terminate seamlessly at an endpoint which is a traditional telephony terminal. In some embodiments, the present disclosure provides for an OTT network to serve as last hop for a voice call initiated from a traditional communication infrastructure.

In some embodiments, the present disclosure provides a user of the OTT service the convenience of making a voice call to a destination on an external platform, e.g., an external service or a business entity, directly from within the OTT application (OTA). In some embodiments, the call can be initiated by clicking an icon directly from, e.g., a smartphone application or a web page maintained by or on behalf of the business entity within the OTA. The OTA user can thus connect to selected local destinations from anywhere in the world using the free OTT platform, without incurring roaming and/or other costs and charges.

In some embodiments, the present disclosure further provides a user of the OTA the convenience of connecting in a voice call directly with an individual endpoint within a business entity telephony system (e.g., a service representative in a customer call center), from within a live or recent communication session (e.g., chat) on a chat page within the OTA.

In some embodiments, the present disclosure provides for a voice call to be initiated by an external service, e.g., a business entity or a call center, to a specified OTT user. In some embodiments, the call can be initiated by an external service providing a OTT user identifier (e.g. dialing number) associated with the OTT user.

Call termination, also known as voice termination, refers to the routing of voice calls from an originating point (i.e., the calling party who initiates the call) to a termination point or an end point. Traditional or legacy telecommunication infrastructure comprise communication networks which use technologies such as GSM, CDMA, WCDMA, public switched telephone network (PSTN), and the like. In some cases, voice over IP (VoIP) technology may be used for one or more hops (e.g., the last hop) in traditional voice communication to an end user device. These networks usually use E.164 numbering format to represent the user identity (e.g. 1-800-5551234). The termination point usually uses a terminal device or application which is capable of receiving calls on traditional telecommunications networks.

In contrast, OTT services provide content, messaging, and/or voice calling independent of the underlying communication infrastructure technology, by accessing the services directly through an Internet-connected platform such as a PC, laptop, tablet, smartphone, smart TV, and other web-enabled devices. OTT terminal applications (OTA) are end user application on devices which are connected to the OTT network and are capable of receiving OTT services (e.g., voice calls) through the network.

In some embodiments, the present disclosure provides for seamlessly routing a voice call originating by a calling party from an OTA to an external endpoint which is serviced by a traditional telecommunication infrastructure (e.g., PSTN).

By way of an example communication session, an OTA user may initiate a connection request call from an OTA to an external traditional telecommunication infrastructure endpoint (e.g., a PSTN extension). In some embodiments, the user may initiate the request from the OTA using a number of ways, e.g., by dialing a number, clicking on a button, icon, and/or hyperlink, and/or any other and/or similar means.

In each case, the call request may be received by a server of the OTT network, which may provide for a seamless connection to the requested endpoint, through one or more routing options and/or preferences. In some embodiments, the connection may be effected based, at least in part, on external service information stored in a database and/or another information repository comprising known endpoint destinations. Known endpoint destinations may comprise, e.g., individuals, enterprises, corporate entities, commercial entities, public institutions, governmental entities and offices, educational entities, etc. In some embodiments, known endpoint destinations may include entities who have established a commercial communication affiliation and/or another connection and/or link with the OTT network.

In some embodiments, the database or repository may be stored and maintained by the OTT network, and/or by any other third-party. In some embodiments, the database may store and manage information about communication endpoints. In some embodiments, each communication endpoint may have a record or a profile stored in a database or distributed through several database tables. An endpoint record or profile may include various properties of a communication endpoint, such as a unique identifier of a telephony endpoint, a direct inbound address (e.g., the phone number or short code), alternative endpoint identifiers (e.g., list of associated OTT services), carrier, origin properties, capability properties (e.g., SMS, MMS, etc.), status (e.g., mobile, landline, client application type, toll free, etc.), service plan (e.g., do they get free SMS/MMS messages), presence information, and/or any other suitable properties of a telephony endpoint. In some embodiments, properties can include, e.g., international call prefix, destination country calling code, an area code, vanity digits, ISO country codes, region properties, and/or any suitable origin properties. The records may include various sets of information depending on the information that is collected.

In some embodiments, each external service endpoint may include one or more routing options and/or preferences, wherein each routing option and/or preference may be associated with one or more communication platforms and/or protocols. In some embodiments, a routing function within the OTT network may be configured to determine how and where to route a call request from the OTA to an external service endpoint, based on numerous parameters (e.g., quality of a destination, cost of a particular destination, predefined and/or preferred routes associated with a calling party, etc.). The routing function may include a network policy and routing management modules to perform decision analysis for network policy and route management such as toll-free routing, least-cost routing, number portability, voice VPN, SIP trunking, centralized dial plans, emergency services, etc.

In some embodiments, the routing function may communicate with an external service endpoint's telecommunications service provider (TSP) to effect one or more legs or hops of the communication. In some embodiments, multiple TSPs may be enlisted to provide call legs, call hops, and/or call termination, e.g., third-party and/or international TSPs and/or other telecommunication providers that are capable of routing a call to an endpoint. For example, the routing function may route a call to a carrier based on established business relations, wherein the carrier will check whether it can make the call to the specified number. If it can, the call will be routed to the external service or to a third party carrier. If it cannot route the call, it will reject the call and the routing function may try a different routing option and/or a next preference.

Reference is made to FIG. 1A which is a schematic representation of an exemplary seamless OTT-to-traditional telephony destination voice call transition, according to some embodiments of the present disclosure.

In some embodiments, a user at an originating endpoint device 102 may originate a voice call request using its OTT application (OTA) on the device, wherein the voice call request is to a called external service endpoint 122.

In some embodiments, the call request may be originated by the user in any number of ways, e.g., by: Dialing, from the OTA, a telephone number (e.g., PSTN telephone number) of the endpoint; dialing, from the OTA, a short code (or short number, e.g., *5555) of the endpoint; dialing, from the OTA, a vanity number (e.g., 1-800-BANKING) of the endpoint; providing indication (e.g., click an icon or hyperlink) from within an OTA page for an enterprise or business entity, to connect by voice with a main telephone number for the enterprise; or providing indication (e.g., click an icon or hyperlink) from within an ongoing or recent communication session (e.g., chat or text messaging) on a chat page in the OTA, with an individual at an enterprise or business entity, to connect by voice with the individual.

In some embodiments, the external service endpoint 122 is a termination point or an end point in a traditional or legacy telecommunication infrastructure, such as a PSTN network. In some embodiments, originating endpoint device 102 may be any web-enabled device, such as a PC, laptop, tablet, smartphone, smart TV, and the like.

In some embodiments, the call request may be received by an OTT network server 112, over Internet 110. In some embodiments, OTT network server 112 may then access a database of known endpoint destinations to obtain information associated with endpoint 122, e.g., one or more routing options associated with endpoint 122.

In some embodiments, OTT network server 112 may then select a routing option and establish a connection with an external telecommunication platform to effect the connection. In some embodiments, OTT network server 112 may route the call request through, e.g., telecommunications service provider (TSP) 120. In some embodiments, TSP 120 may terminate the call with external service 122. In some embodiments, the routing may be performed using any of PSTN, toll-free routing, least-cost routing, voice Virtual Private Network (VPN), and/or Session Initiation Protocol (SIP) trunking.

In some embodiments, OTT network server 112 may route the call request directly to external service 122 through a dedicated connection line, e.g., a SIP trunk established between the OTT network and the external service.

Figure 1B:
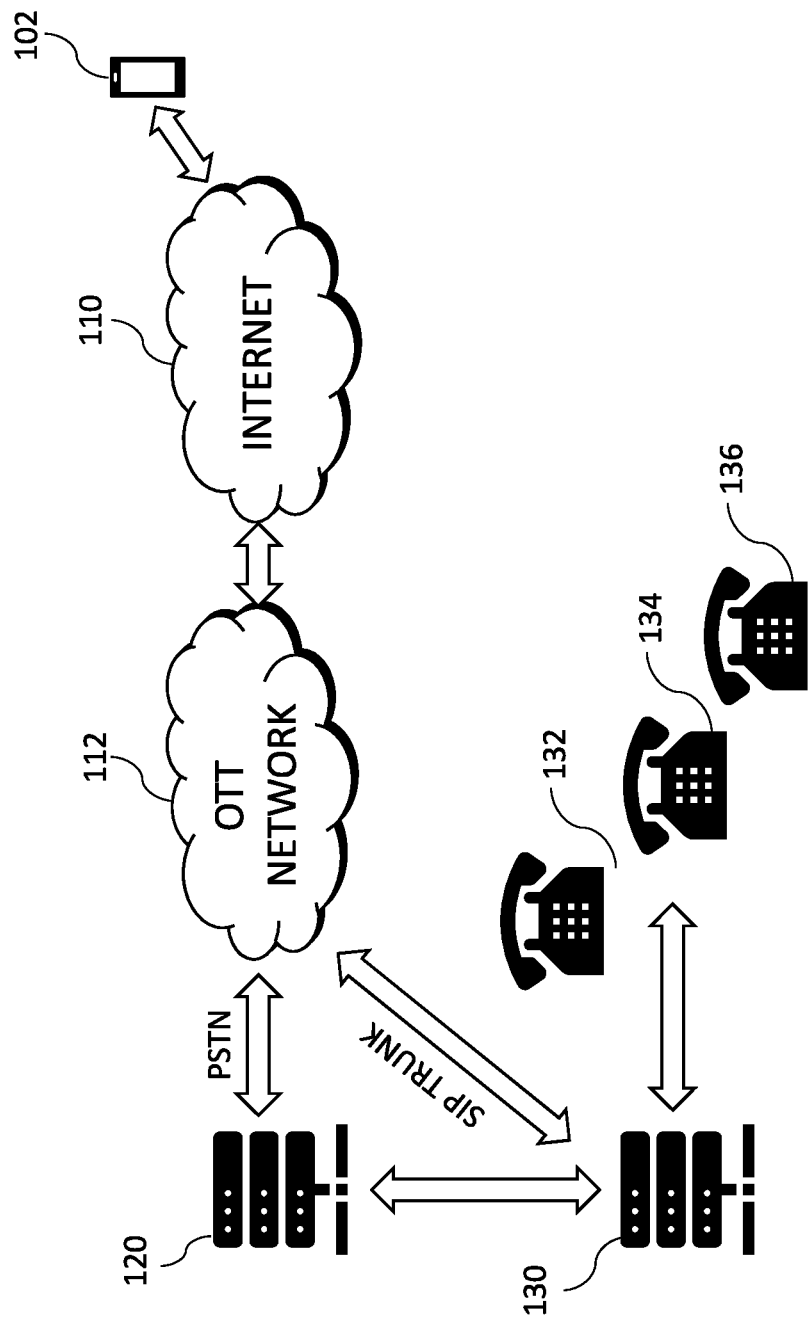
FIG. 1B is a schematic representation of another exemplary seamless OTT-to-traditional telephony destination voice call transition, according to some embodiments of the present disclosure.

FIG. 1B is a schematic representation of another exemplary seamless OTT-to-traditional telephony destination voice call transition, according to some embodiments of the present disclosure.

In some embodiments, a user at an originating endpoint device 102 may originate a voice call request using its OTT application (OTA) on the device, wherein the voice call request is to a called external service endpoint 132, 134, or 136 within a business enterprise (e.g., a call center agent). In some embodiments, external service endpoints 132, 134, 136 may each be an individual destination within a business entity telephony system 130 (e.g., service representatives in a customer call center).

In some embodiments, business entity telephony system may be set up to support call routing from OTT network server 112 to any of destinations 132, 134, 136.

In some embodiments, call request from endpoint device 102 may be initiated from within a communication session (e.g., chat or text messaging) in the OTA with one of destinations 132, 134, 136, e.g., via click on a suitable icon or hyperlink.

In some embodiments, OTT network server 112 may communicate with business entity telephony system 130 to provide and receive suitable context from the communication session between endpoint device 102 and an external service endpoint 132, 134, 136, to enable terminating the call with the appropriate external service endpoint 132, 134, 136, and provide seamless flow of customer/agent chat and voice communication.

In some embodiments, the call request may be received by an OTT network server 112, over Internet 110. In some embodiments, OTT network server 112 may then access a database of known endpoint destinations to obtain information associated with business entity telephony system 130, one or more routing options associated with endpoint 122.

In some embodiments, OTT network server 112 may then select a routing option and establish a connection with business entity telephony system 130, e.g., over PSTN, another conventional telephony link, and/or a SIP trunk line. In some embodiments, OTT network server 112 may route the call request through, e.g., business entity telephony system 130, which may terminate the call with an external service endpoint 132, 134, 136 based on the contextual information obtained from the session.

In one aspect of the present invention, a voice communications link may be provided over the Internet 110 based upon Voice over IP (VoIP) protocol. In another aspect of the present invention, a voice communications link may be provided using a conventional telephony link provided by conventional telephony gateways over a PSTN network.

According to some embodiments of the present invention, the calling party is a user of a mobile device. According to some embodiments of the present invention, the called party is a business call center.

Figure 1C:
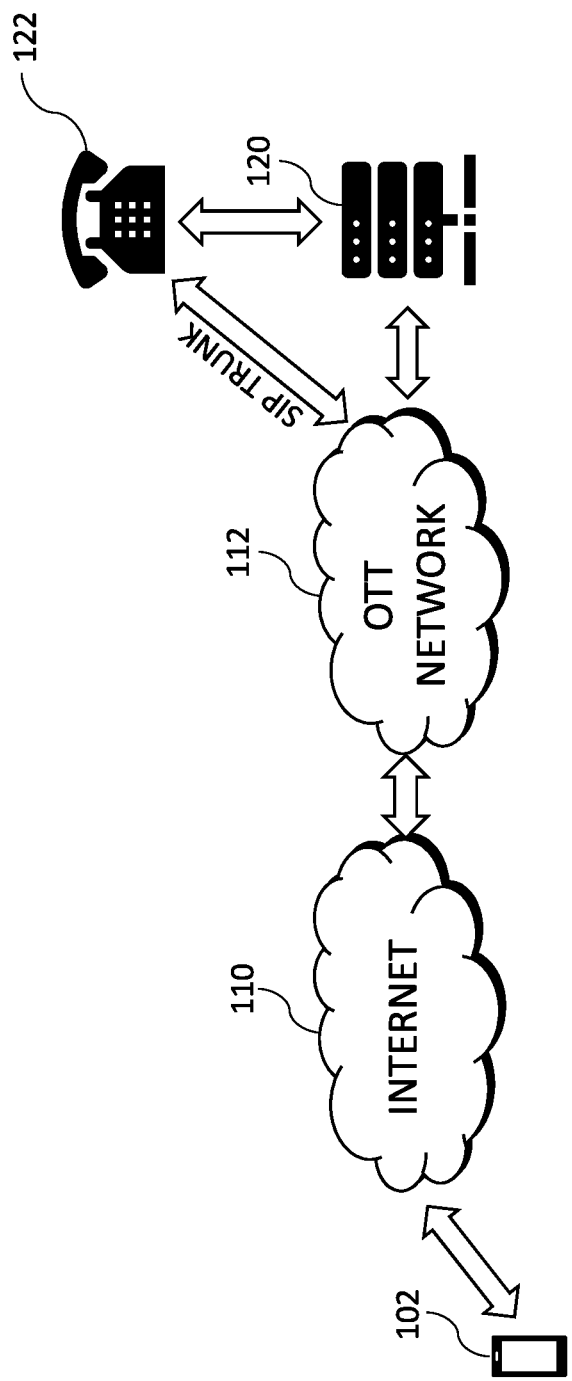
FIG. 1C is a schematic representation of an exemplary seamless traditional telephony-to-OTT destination voice call transition, according to some embodiments of the present disclosure.

FIG. 1C is a schematic representation of an exemplary seamless traditional telephony-to-OTT destination voice call transition, according to some embodiments of the present disclosure. In some embodiments, external service endpoint may dial an OTT user number, to initiate a call termination request to the OTT network server. In some embodiments, the number may be a standard telephony number, e.g., an international calling number. In some embodiments, the call request may be routed through a telecommunication service provider, e.g., TSP 120. Once OTT network server 112 received the request, it may perform a check to determine whether the request may be terminated with the OTA user. For example, the OTT network server 112 may query the OTT user database to check if the number is registered as a subscriber on the OTT network. An additional check may be done on an OTT real-time online users records data base to check if the user is online and free to receive the call.

In some embodiments, OTT network server 112 may then communicate to the external service and/or TSP 120, as the case may be, the results of the check. In some embodiments, OTT network server 112 may then terminate the call at endpoint device 102. When an OTA uses a proprietary protocol, a conversion to standard protocols may be required, as known in the art.

Figure 2:
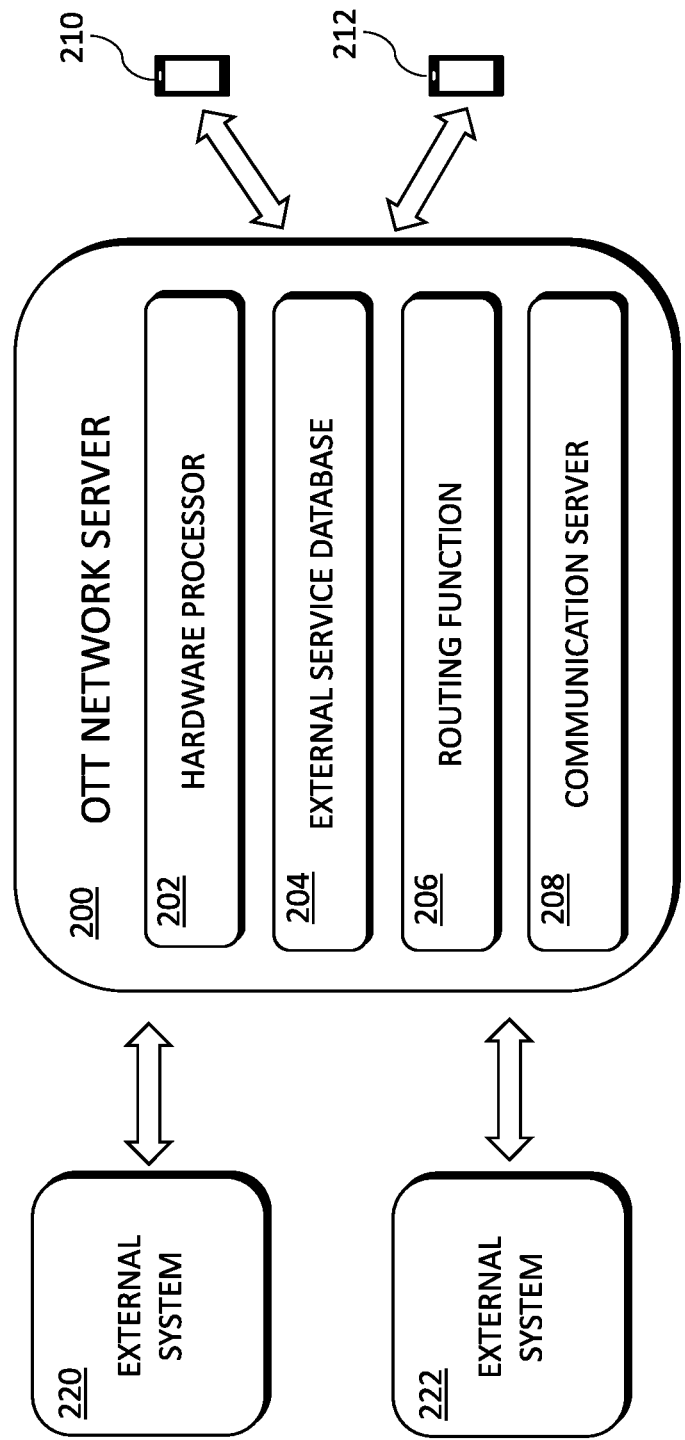
FIG. 2 is a schematic a block diagram of an exemplary system, according to an embodiment of the present invention.

Reference is made to FIG. 2, which is a schematic block diagram of an exemplary system 200 according to an embodiment of the present invention. System 200 as described herein is only an exemplary embodiment of the present invention, and in practice may have more or fewer components than shown, may combine two or more of the components, or may have a different configuration or arrangement of the components. The various components of system 200 may be implemented in hardware, software or a combination of both hardware and software. In various embodiments, system 200 may comprise a dedicated hardware device, or may form an addition to/or extension of an existing device. System 200 may store software instructions or components configured to operate a hardware processor 202 (also "hardware processor," "CPU," or simply "processor"). In some embodiments, the software components may include an operating system, including various software components and/or drivers for controlling and managing general system tasks (e.g., memory management, storage device control, power management, etc.) and facilitating communication between various hardware and software components.

In some embodiments, system 200 may comprise a hardware processor 202, an external services database or information repository 204, a machine learning module 206, and a communications server 208.

In some embodiments, the communication server 208 may be configured for connecting system 200 to a network, such as the internet, a local area network, a wide area network and/or a wireless network. In some embodiments, the communication server 208 facilitates communications with other devices over one or more external ports, and also includes various software components for handling data received by system 200.

In some embodiments, the communication server 208 may be configured to enable communication between a machine learning module 206 and computerized processes, and/or data bases which may be reachable over the network.

According to some embodiments, a routing function of communication server 208 may forward calls to machine learning module 206 that may be trained to identify call patterns and to predict a destination the calls should terminate to within external system 220, 222. For example, sales representative or customer support representative in a service provided (external system 220, 222).

In some embodiments, system 200 may include one or more of: an endpoint communication profile repository, a communication API module, a routing option determination module, and/or a TSP communication provider selection module.

In some embodiments, system 200 may be communicatively coupled with external communications providers 220, 222.

In some embodiments, communication server 208 performs at least some of the following with respect to a call request: determining a communication destination and account information; determining a routing option of the communication platform that matches the communication destination of the communication request; associating the communication destination with one or more external communication providers; selecting at least one communication provider associated with the routing option; and/or providing a request to establish communication with the communication destination to each selected communication provider.

In some implementations, each communication provider includes at least one of an SMS service provider, MMS service provider, push notification service provider, IP messaging service provider, proprietary third party OTT messaging service provider, proprietary third party OTT communication service provider, PSTN service provider, SIP voice service provider, Video communication service provider, screensharing service provider, fax service provider, and email service provider.

In some implementations, each routing option stored at external services database 204 associates a communication destination with at least one external communication provider. In some implementations, each routing option associates a communication destination with a plurality of external communication providers.

Figure 3:
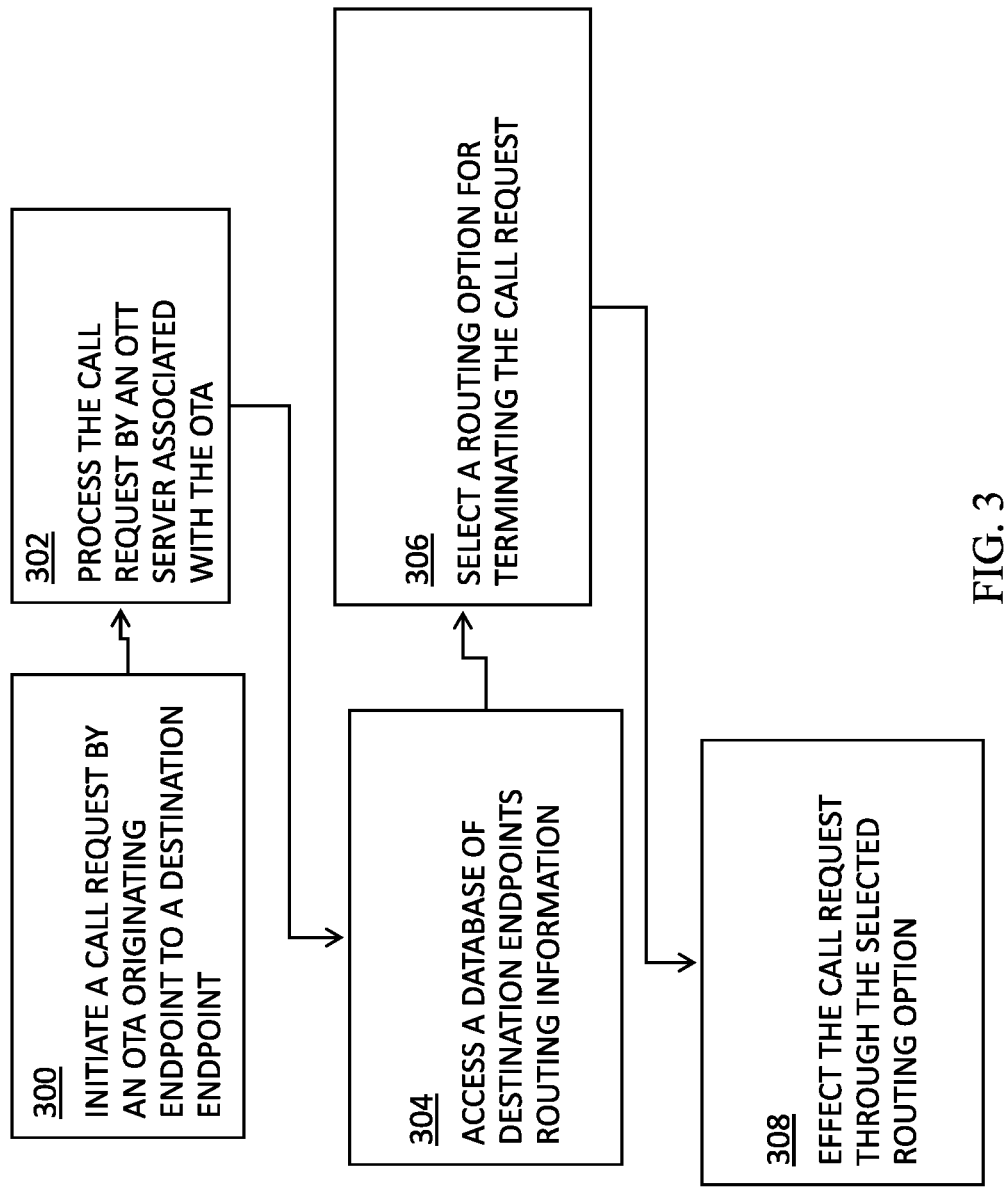
FIG. 3 is a flowchart of the functional steps in a process for routing a call from an originating endpoint of a calling party using an OTT call service to a terminating point of a called party, according to some embodiments of present invention.

Reference is now made to FIG. 3, which is a flowchart of the functional steps in a process for routing a call from an originating endpoint of a calling party using an OTT call service to a terminating point of a called party, according to some embodiments of present invention.

In step 300, originating endpoint attempts to place a call, using an OTT OTA, to external service endpoint of a called party, by transmitting a request to the OTT network server.

In step 302, OTT network server, in response to receiving the call request, analyses the request and accesses a database and/or information repository to retrieve information associated with the requested destination. In some embodiments, the information in the database about the OTT calling party and the received information related to the called party maps the information related to the called party to an external service endpoint phone number.

In step 304, the OTT network selects a routing option associated with the external service endpoint. For example, the OTT network server may determine a communication destination and account information; determine a routing option; associate the communication destination with one or more external communication providers; select at least one communication provider associated with the routing option; and/or provide a request to establish communication with the communication destination to each selected communication provider.

In step 306, the OTT network server may effect the call request using the selected routing option.

Figure 4A:
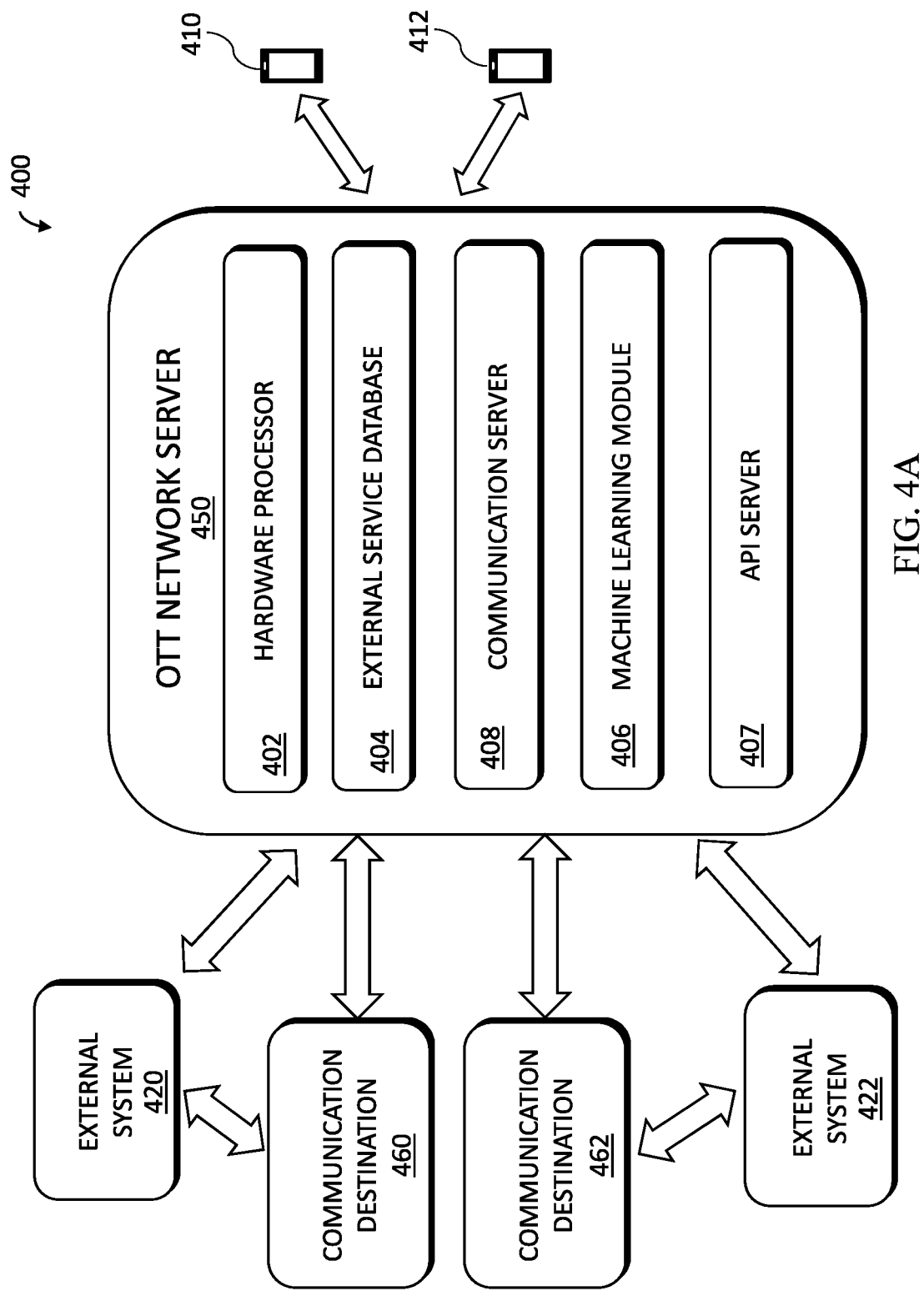
FIG. 4A is a schematic block diagram of a system for seamless OTT-to-traditional telephony destination voice call transition, according to embodiments of the present invention.

Reference is now made to FIG. 4A which is a schematic block diagram of a system for seamless OTT-to-traditional telephony destination voice call transition, according to embodiments of the present invention. System 400 may include one or more OTT network servers 450, user devices 410, 412, external systems 420, 422 and one or more communication destinations 460, 462. User devices 410, 412 may be any type of communication device suitable for communicating over an OTT network, such as, one or more smartphones, tablet computers, laptop computers, desktop computers, and the like. System 400 may further include OTT network server 450, and a database 404 and one or more external systems 420, 422. Database 404 may be integral to and/or in active communication with OTT network server 450, and with one or more external systems 420, 422, such as service providers or communication destinations 460, 462.

According to some embodiments, database 404 may be in active communication with one or more communication destinations 460, 462 in addition to or instead of communication with external systems 420, 422.

In some embodiments, database 404 may receive, directly from communication destinations 460, 462 and/or from external systems 420, 422 information regarding the communication destination 460, 462, such as, for example, routing information, queue length at communication destination 460, 462, working hours of communication destination 460, 462 and the like. When a call is initiated from OTA to communication destination 460, 462 API server 407 may query database 404 to obtain communication destination business information pushed to database 404 from communication destinations 460, 462, directly or via external systems 420, 422. According to some embodiments, business information may include, working hours, queue and waiting time for service, business logo, and the like. API server 407 may check for live chat session, by querying database 404 and return to the user device 410, 412, a chat session ID. The chat session ID may then be forwarded to communication server 408 together with a call request so that, for example, the call will be directed to the specific person with whom the chat was conducted. Communication server 408 may then query database 404 to obtain routing and protocol information to establish a call with communication destination 460, 462, either directly or via external system 420, 422.

According to some embodiments, OTT network server 450 may include a machine learning module 407.

In some embodiments, the communication server 408 may be configured to connecting OTT network server 450 to a network, such as the internet, a local area network, a wide area network and/or a wireless network. In some embodiments, the communication server 408 may facilitate communications with other devices over one or more external ports, and also may include various software components for handling data received by system 400. In some embodiments, the communication server 408 may be configured to enable communication between machine learning module 407 and computerized processes, and/or databases (such as database 404 or external databases) which may be reachable over the network.

According to some embodiments, a routing function of communication server 408 may forward calls to machine learning module 407 that may be trained to identify call patterns and to predict a destination the calls should terminate to within external system 420, 422 and/or communication destination 460, 462. For example, sales representative or customer support representative in a service provided (external system 220, 222 and/or communication destination 460, 462).

Figure 4B:
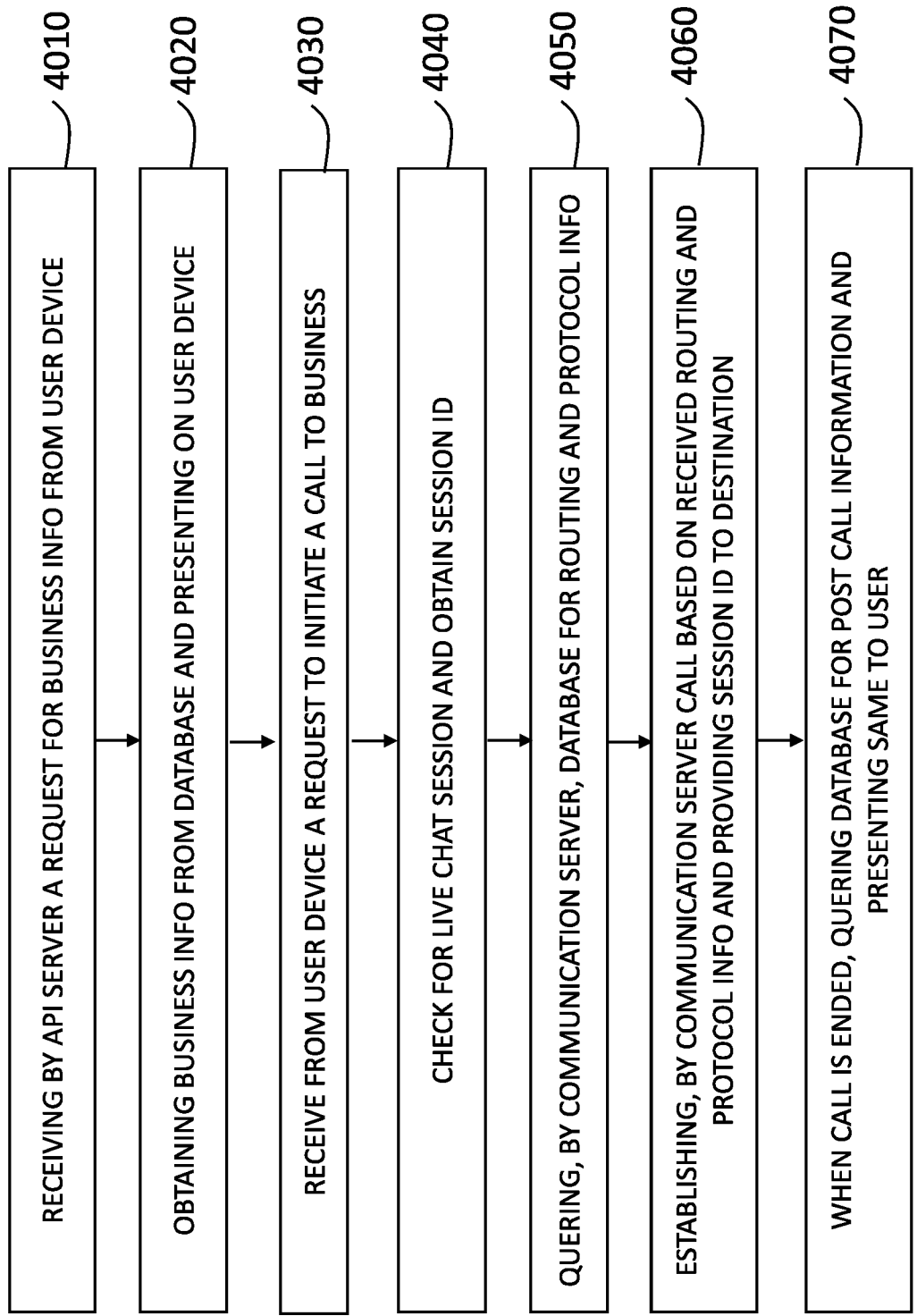
FIG. 4B is a flowchart of a method for seamless OTT-to-traditional telephony destination voice call transition, according to embodiments of the present invention.

Reference is now made to FIG. 4B which is a flowchart of a method of establishing a call between an OTT application and a communication destination such as a call center. As illustrated in FIG. 4B, when a user is interested in calling a communication destination, such as a call center, the user may send a request, via a user device to an API server of an OTT network, to obtain information, such as business information, regarding the communication destination (step 4010). According to some embodiments, such information may be provided to a database (such as database 404 in FIG. 4A, or 230 in FIG. 2) by communication destinations such as businesses and call centers. At step 4020, the API server obtains the requested information from the database and provides it to the user device. The information presented to the user, on user device may include, according to some embodiments, a logo of the communication destination, list of services provided by the communication destination, the waiting time for a specific service, working hours of each service etc. The user can than start a chat or a call with the communication destination.

In step 4030, API server may receive a request from the user device to initiate a call with a communication destination such as a call center of a business. At step 4040, API sever may query the database to check if there is a live chat session between the user and obtain a session ID if a chat session is taking place between the user and the communication destination. The chat session ID may be returned to user device or provided directly to communication server that in turn may query the database for routing information and protocol information in order to establish a communication channel with communication destination (step 4050). Once communication server receives the routing information and the protocol information, as well as, when there is a live chat session, the session ID, the communication server may establish a call based on the routing information and the protocol information (step 4060). When establishing the call, according to some embodiments, communication server may provide the communication destination with the chat session ID to allow referring the call to the representative that participated in the live chat session.

According to some embodiments, when a call is ended, at step 4070, API server may query the database for additional information that should be presented to the user. For example, post call surveys, information sent by the representative and the like. The post call information may then be presented by API server on the user device.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

At least some of the subject matter described herein may be implemented in digital electronic circuitry, in computer software, firmware, hardware, or in combinations of them. The subject matter described herein may be implemented as one or more computer program products, i.e. one or more computer programs tangibly embodied in a non-transitory media, e.g. in a machine-readable storage device, for execution by, or control the operation of a data processing apparatus, e.g. a programmable processor, a computer or multiple computers. A computer program (also known as a program, software, software application or code) can be written in any programming language. A computer program does not necessarily correspond to a file. A computer program can be executed on one computer or on multiple computers at one site or distributed across multiple sites.

It will be appreciated by persons skilled in the art that the present invention is not limited to what has been particularly shown and described hereinabove. Rather the scope of the present invention is defined by the appended claim.

This written description uses examples to disclose various implementations, to enable any person skilled in the art to practice those implementations, including making and using any devices or systems and per forming any incorporated methods. The patentable scope is defined by the claims, and may include other examples that occur to those skilled in the art. Such other examples are intended to be within the scope of the claims if they have structural elements that 10 do not differ from the literal language of the claims, or if they include equivalent structural elements with insubstantial differences from the literal languages of the claims. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a hardware processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

What is claimed is:

1. A system comprising:
   at least one hardware processor; and
   a non-transitory computer-readable storage medium having stored thereon program code, the program code executable by the at least one hardware processor to:
      receive, by an over-the-top (OTT) network server, from an OTT terminal application (OTA), a request to establish voice communication with a known external service;
      access, by said OTT network server, a database which comprises one or more routing options associated with said known external service, wherein said database comprises routing options associated with a plurality of known external services;
      select, by said OTT network server, one of said routing options for establishing said voice communication, wherein said routing option comprises at least one communication leg effected through a telephony gateway of a PSTN and is associated with a telephony endpoint operated by the known external service; and
      establish said voice communication with said known external service by connecting the OTA and the telephony endpoint using said selected routing option,
      wherein said request is associated with an OTT active live chat session between a user of said OTA and said known external service, and wherein an identity of said known external service is determined based, at least in part, on said OTT live chat session, and wherein the request is received from within the OTT live chat session, and wherein the at least one hardware processor selects the routing option based on an identifier of the known external service.

2. The system of claim 1, wherein said database further comprises, with respect to each of said known external services, information comprising at least one of: a unique identifier of a telephony endpoint, a telephone number, and a short code number.

3. The system of claim 1, wherein said selected routing option comprises at least one leg effected through a telecommunications service provider (TSP).

4. The system of claim 3, wherein said establishing comprises communicating, by said OTT network server, to said TSP, at least some of said information associated with said known external service.

5. The system of claim 1, wherein said selected routing option comprises at least one leg effected through a dedicated communications line between said OTT network server and said known external service.

6. The system of claim 1, wherein each of said routing options is associated with at least one of: a PSTN service, a voice over IP (VOIP) service, a Session Initiation Protocol (SIP) voice service, and an external OTT network.

7. The system of claim 1, wherein said known external service comprises a communication system comprising a plurality of endpoints, and wherein said request is to establish voice communication with a specific one of said endpoints.

8. A method comprising:
receiving, by an over-the-top (OTT) network server, from an OTT terminal application (OTA), a request to establish voice communication with a known external service;
accessing, by said OTT network server, a database which comprises one or more routing options associated with said known external service, wherein said database comprises routing options associated with a plurality of known external services;
selecting, by said OTT network server, one of said routing options for establishing said voice communication, wherein said routing option comprises at least one communication leg effected through a telephony gateway of a PSTN and is associated with a telephony endpoint operated by the known external service; and
establishing said voice communication with said known external service by connecting the OTA and the telephony endpoint using said selected routing option,
wherein said request is associated with an OTT active live chat session between a user of said OTA and said known external service, and wherein an identity of said known external service is determined based, at least in part, on said OTT live chat session, and
wherein the request is received from within the OTT live chat session, and
wherein the selecting is based on an identifier of the known external service.

9. The method of claim 8, wherein said database further comprises, with respect to each of said known external services, information comprising at least one of: a unique identifier of a telephony endpoint, a telephone number, and a short code number.

10. The method of claim 8, wherein said selected routing option comprises at least one leg effected through a telecommunications service provider (TSP).

11. The method of claim 10, wherein said establishing comprises communicating, by said OTT network server, to said TSP, at least some of said information associated with said known external service.

12. The method of claim 8, wherein said selected routing option comprises at least one leg effected through a dedicated communications line between said OTT network server and said known external service.

13. The method of claim 8, wherein each of said routing options is associated with at least one of: a PSTN service, a voice over IP (VOIP) service, a Session Initiation Protocol (SIP) voice service, and an external OTT network.

14. The method of claim 8, wherein said known external service comprises a communication system comprising a plurality of endpoints, and wherein said request is to establish voice communication with a specific one of said endpoints.

15. A system comprising:
at least one hardware processor; and
a non-transitory computer-readable storage medium having stored thereon program code, the program code executable by the at least one hardware processor to:
receive, by an over-the-top (OTT) network server, from an OTT terminal application (OTA), a request to establish voice communication with a known external service;
access, by said OTT network server, a database which comprises one or more routing options associated with said known external service, wherein said database comprises routing options associated with a plurality of known external services;
select, by said OTT network server, one of said routing options for establishing said voice communication, wherein said routing option comprises at least one communication leg effected through a telephony gateway of a PSTN and is associated with a telephony endpoint operated by the known external service; and
establish said voice communication with said known external service by connecting the OTA and the telephony endpoint using said selected routing option,
wherein said request is associated with an OTT active live chat session between a user of said OTA and said known external service, and wherein an identity of said known external service is determined based, at least in part, on said OTT live chat session,
wherein the request is received from within the OTT live chat session, and
wherein the voice communication is initiated by the telephony endpoint operated by an external service provider.

* * * * *